United States Patent
Wajima

(10) Patent No.: US 6,498,613 B1
(45) Date of Patent: Dec. 24, 2002

(54) MENU DISPLAY APPARATUS CAPABLE OF VARYING MENU DISPLAY AREA AND TOTAL MENU ITEM NUMBER DISPLAYED ON CABINET HOLDER IMAGE, AND PROGRAM STORAGE MEDIUM

(75) Inventor: Yuka Wajima, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/503,959

(22) Filed: Feb. 14, 2000

(30) Foreign Application Priority Data

Feb. 19, 1999 (JP) .......................................... 11-040736

(51) Int. Cl.[7] ................................................ G06F 3/14
(52) U.S. Cl. ...................... 345/775; 345/841; 345/853; 345/839
(58) Field of Search ................................ 345/775, 841, 345/843, 828, 853, 854, 855, 839, 810, 811, 815, 808, 809, 804, 848, 850, 851, 769

(56) References Cited

U.S. PATENT DOCUMENTS

| | | | | |
|---|---|---|---|---|
| 4,601,003 A | * | 7/1986 | Yoneyama et al. | 345/775 |
| 5,305,435 A | * | 4/1994 | Bronson | 345/775 X |
| 5,751,287 A | * | 5/1998 | Hahn et al. | 345/775 |
| 5,969,720 A | * | 10/1999 | Lisle et al. | 345/775 |
| 6,133,918 A | * | 10/2000 | Conrad et al. | 345/804 |
| 6,240,421 B1 | * | 5/2001 | Stolarz | 345/854 X |
| 6,377,286 B1 | * | 4/2002 | Hochmuth | 345/810 |

* cited by examiner

Primary Examiner—Raymond J. Bayerl
(74) Attorney, Agent, or Firm—Frishauf, Holtz, Goodman & Chick, P.C.

(57) ABSTRACT

In a menu display apparatus, when a user selects a desirable item from a large number of items displayed in a drawing unit image on a display screen, the user can have such a feeling that the user actually uses a storage cabinet. The menu display apparatus is arranged by: image display means for displaying an image represented by such an image structure that a plurality of drawings are stored into storage units thereof; operation detecting means for detecting a drawing amount of a desirable drawing unit when an instruction is issued so as to draw the desirable drawing unit among the plurality of drawing units displayed within the image; display control means for displaying the drawing-instructed desirable drawing unit in a display size defined in response to the detected drawing amount; and item display means for displaying the respective items related to the drawing-instructed desirable drawing unit within the desirable drawing unit in such a display form in accordance with the display size of the desirable drawing unit. As a result, the menu display apparatus displays a menu used to select the respective items related to the desirable drawing unit.

12 Claims, 9 Drawing Sheets

FIG.3A

| CABINET HOLDER | INDEX ICON | FILE NAME | USE FREQUENCY | DRAWING LEVEL |
|---|---|---|---|---|
| A | (1) | F1 | N1 | 0 |
| | (2) | F2 | N2 | |
| | ⋮ | ⋮ | ⋮ | |
| | (n) | Fn | Nn | |
| B | | | | 1 |
| | | | | |
| | | | | |

21 CABINET MANAGEMENT TABLE

FIG.3B

| DRAWING LEVEL | FOLDER SIZE | DISPLAY ICON NUMBER |
|---|---|---|
| (1) | S1 | 2 |
| (2) | S2 | 4 |
| (3) | S3 | 6 |
| ⋮ | ⋮ | ⋮ |
| (N) | | |

22 DRAWING LEVEL TABLE

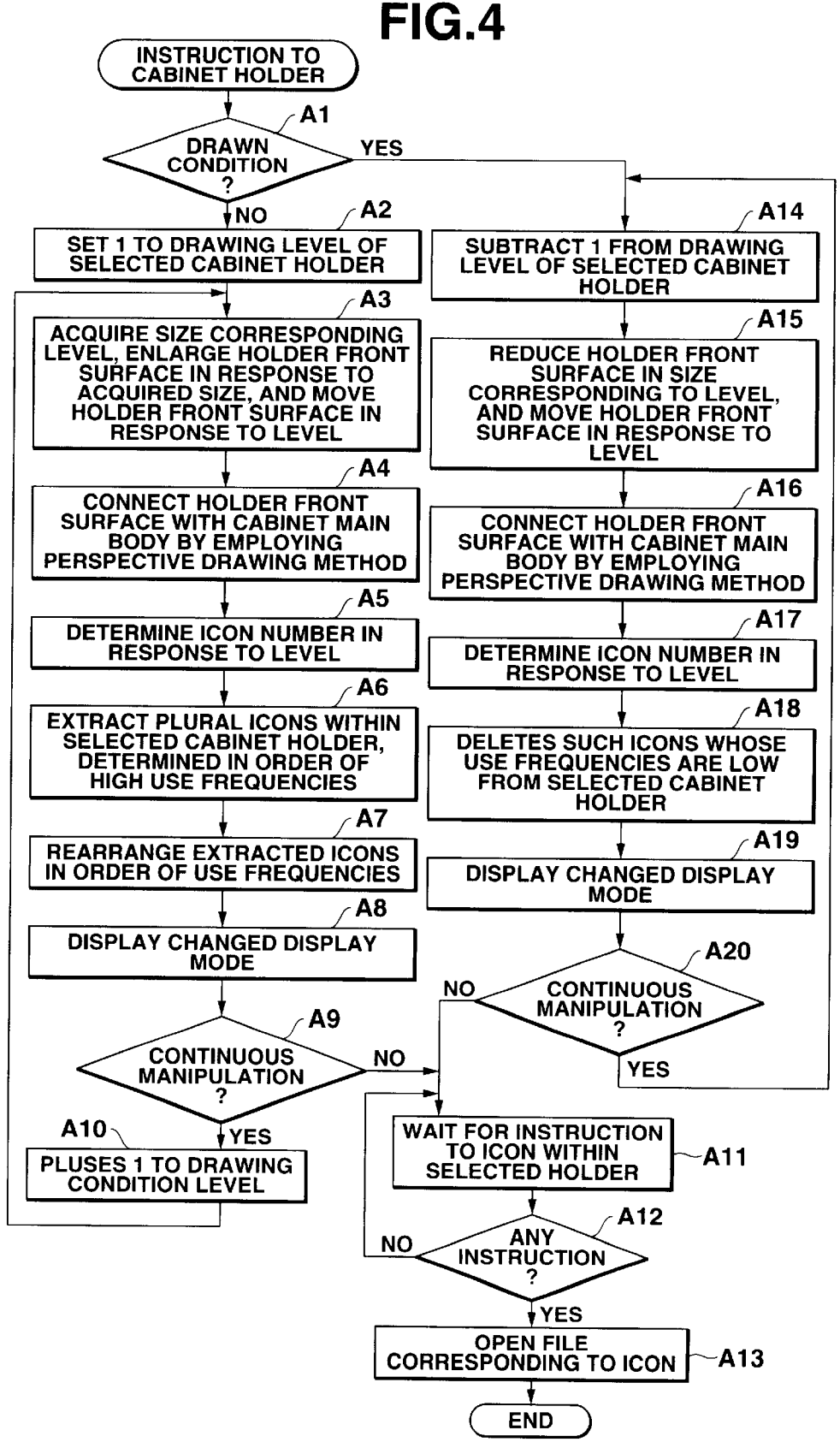

MENU DISPLAY APPARATUS CAPABLE OF VARYING MENU DISPLAY AREA AND TOTAL MENU ITEM NUMBER DISPLAYED ON CABINET HOLDER IMAGE, AND PROGRAM STORAGE MEDIUM

BACKGROUND OF THE INVENTION

1. Field of the Invention

The present invention generally relates to a menu display apparatus for displaying a menu used to arbitrary select a desirable item, and a program storage medium. More specifically, the present invention is directed to a data processing apparatus capable of varying a menu display area and also a total menu item number displayed on a cabinet holder image in response to a user instruction, and is directed to a storage medium for storing thereinto a program of this data processing apparatus.

2. Description of the Related Art

Conventionally, as menu screens for application software, there are typically two different menu formats. That is, in a hierarchical structure type menu format process modes are moved from upper-grade menus to lower-grade menus. In a list-shaped menu format, all of menus are simply arranged in a list shape irrespective of process modes. In the first-mentioned hierarchical structure type menu format, when an arbitrary menu icon is selectively designated under such a condition that icons corresponding to menu items of an upper-grade layer are displayed in a list form, the menu screen is switched from the menu screen of the upper-grade layer to the menu screen of the lower grade screen. In the list-mentioned list-shaped menu format, the menu screen is switched in the unit of a page while manipulating a preceding page key and/or a succeeding page key.

However, these conventional menu formats own the below-mentioned problems. That is, in the list-shaped menu format, the larger the item number of the menu is increased, the larger the total page number thereof is increased. As a result, the user must switch the pages many times. Also, in the hierarchical structure type menu format, under such a condition that the present menu screen is switched to the menu screen of the lower-grade layer, the menu item of the upper-grade layer corresponding thereto cannot be confirmed. Furthermore, when the present menu screen is moved from the lower-grade layer to the high-grade layer, the present menu screen must be once returned to the menu screen of the upper-grade layer. As previously described, the menu screens must be switched so as to display a desirable menu screen in any of these conventional menu formats. As a consequence, cumbersome operations are necessarily required, and also the user cannot readily grasp the entire menu structure.

SUMMARY OF THE INVENTION

The present invention has been made to solve the above-described problems, and therefore, has an object to provide such a data processing apparatus capable of selecting a necessary item from a large number of items, while having such a feeling that a user actually uses a storage cabinet.

Furthermore, the present invention has another object to provide a data processing apparatus capable of freely increasing/decreasing a dimension of a menu display area and also a total number of menu items in response to an operation instruction issued to this menu display area in such a case that an arbitrary menu item is selected from a plurality of menu items.

In accordance with the data processing apparatus of the present invention, under such a condition that a cabinet image is displayed and this cabinet image is represented by such an image structure that a drawing unit is stored into a cabinet main body, this drawing unit is displayed as being drawn with respect to the cabinet main body in response to an operation instruction issued to this drawing unit. Also, identifiers of the respective items related to this drawing unit are indicated in a list form within this drawing unit. Then, a desirable item identifier is selectively designated from the respective item identifiers listed in this drawing unit.

As a consequence, the user can select the necessary item from a large number of items, while having such a feeling that the storage cabinet is actually used. Therefore, the item selection can be visually grasped, and a desirable item can be effectively selected.

Also, in accordance with the present invention, such an image is displayed which is represented by an image structure that a plurality of drawing units are stored into a storage unit, and when a drawing instruction is issued to a desirable drawing unit, a drawing amount of this desirable drawing unit is detected. Then, this drawing unit is displayed with such a display size defined in correspondence to this detected drawing amount. The respective items related to this desirable drawing unit are displayed within this desirable drawing unit by a display form in accordance with the display size of the desirable drawing unit.

As a consequence, in such a case that an arbitrary item is selected from a large number of items, while the display forms of the items classified by the plural drawing units are adjusted in a readable shape, the desirable item can be effectively selected.

Also, the dimension of the menu display area is changed in response to an operation instruction issued to this menu display area, and also the plural menu items whose total number is equal to the dimension of this menu display area are indicated within this menu display area. Then, a desirable item is selectively designated from the respective menu items displayed in this menu display area.

As a consequence, when an arbitrary menu item is selected from a plurality of menu items, the dimension of the menu display area and the total number of menu items can be freely increased/decreased in response to the operation instruction with respect to the menu display area. Therefore, the user can visually grasp the selected item and also can effectively select the desirable item.

BRIEF DESCRIPTION OF THE DRAWINGS

For a better understanding of the present invention, reference is made of a detailed description to be read in conjunction with the accompanying drawings, in which:

FIG. 3A is a diagram for indicating a data structure of a cabinet management table 21 employed in the data processing apparatus of FIG. 1, and FIG. 3B is a diagram for indicating a data structure of a drawing level table 22 employed in the data processing apparatus of FIG. 1;

FIG. 4 is a flow chart for describing a hierarchical menu selecting process operation of the data processing apparatus shown in FIG. 1;

DETAILED DESCRIPTION OF THE PREFERRED EMBODIMENTS

Referring now to FIG. 1 to FIG. 9, a data processing apparatus according to the present invention will be explained in detail.

Overall Arrangement of First Data Processing Apparatus

Figure 1:
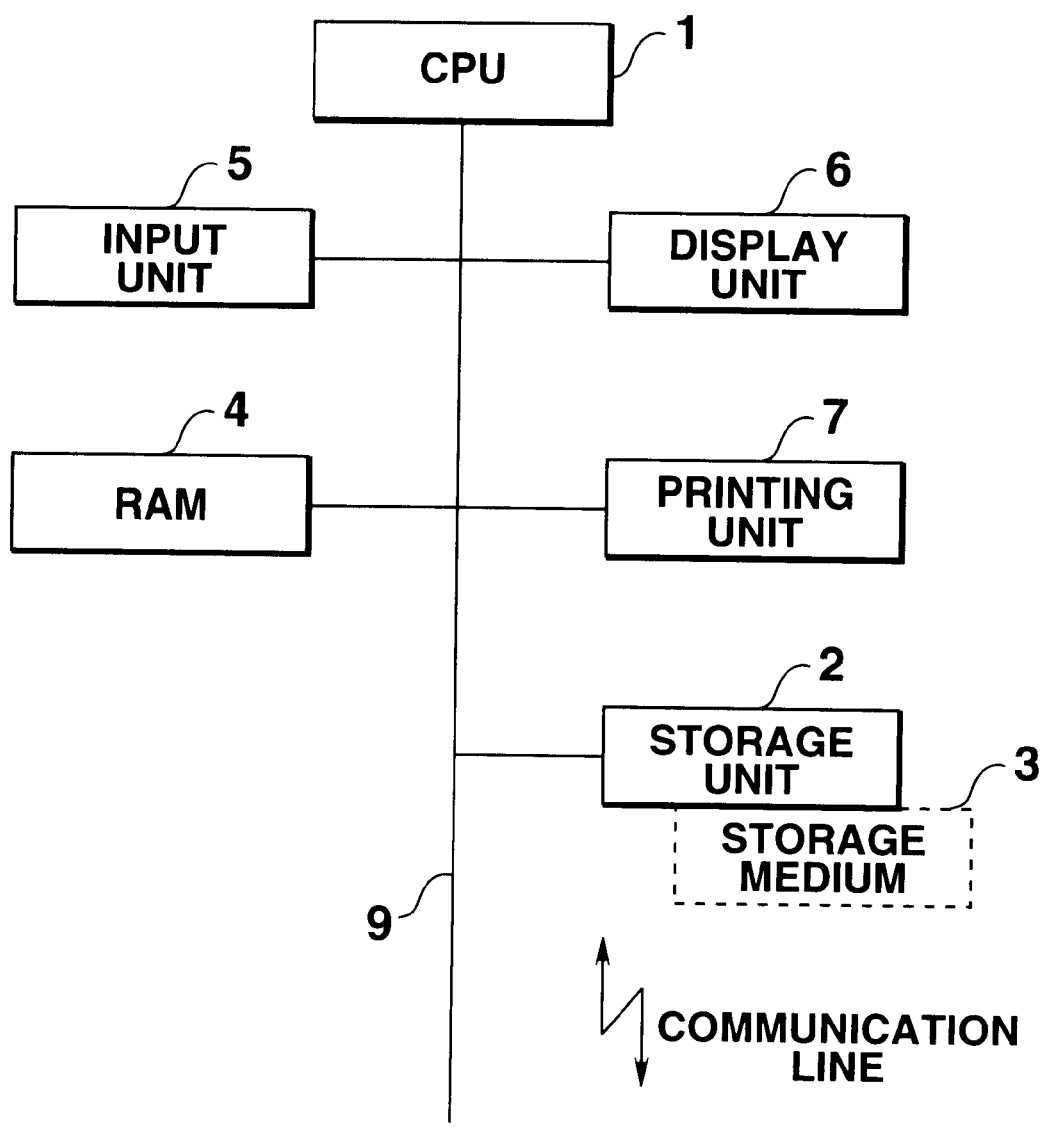
FIG. 1 is a schematic block diagram for representing an overall arrangement of a data processing apparatus according to a first embodiment mode of the present invention.

FIG. 1 is a schematic block diagram for indicating an entire arrangement of the data processing apparatus according to this first preferred embodiment of the present invention.

In this first data processing apparatus, a CPU (central processing unit) 1 is a central processing,unit capable of controlling an entire operation of this first data processing apparatus in accordance with various sorts of programs stored in a storage unit 2 which contains a storage medium 3 and a drive system of this storage medium 3. The storage medium 3 previously stores thereinto an operating system (OS), various sorts of application programs, a database, character font data, and the like. This storage medium 3 may be realized as either a fixed type storage medium or a detachably mounted type storage medium. These storage media may be constructed of, for example, a floppy disk, a hard disk, an optical disk, a RAM card, and the like, namely, a magnetic storage medium, an optical storage medium, and a semiconductor memory. The programs and data stored in this storage medium 3 are loaded to the RAM (random access memory) 4 under control of the CPU 1, if required. Furthermore, the CPU 1 may receive other programs and data which are transmitted from other electronic appliances via a communication line and then may store the received programs and data into the above-described storage medium 3. Alternatively, the CPU 1 may use other programs and data via the communication line, which are stored in another storage medium (not shown) provided in another electronic appliance (not shown either). Also, since input/output peripheral devices are connected via a bus line to this CPU 1, the CPU 1 may control operations of these input/output peripheral devices in accordance with an input/output program. As the input/output peripheral devices, there are provided an input unit 5, a display unit 6, and a printing unit 7.

The input unit 5 contains a keyboard capable of entering character stream data and various sorts of commands, and a pointing device such as a mouse. The display device 6 may be realized in the form of a liquid crystal display (LCD) device, a CRT display device, and a plasma display device. Also, the printing device 7 may be realized in the form of a non-impact printer (thermal printer, ink-jet printer) and a dot impact printer.

Menu Selection Screen

Figure 2A:
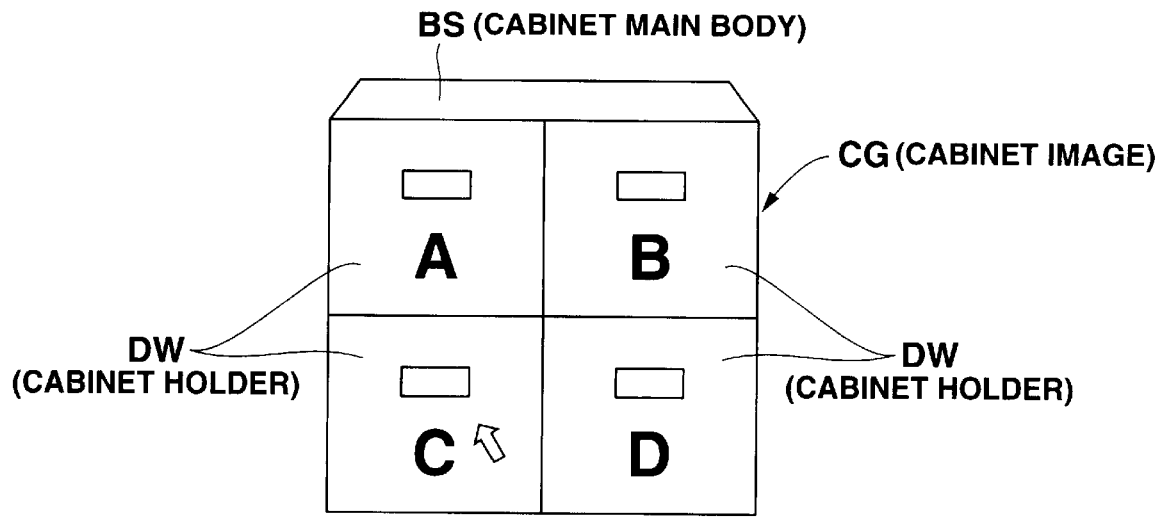
FIG. 2A illustratively shows a cabinet image CG displayed on a menu selection screen of the data processing apparatus shown in FIG. 1, and FIG. 2B illustratively indicates a display state diagram in which a cabinet holder DW of the cabinet image CG is drawn.
Figure 2B:
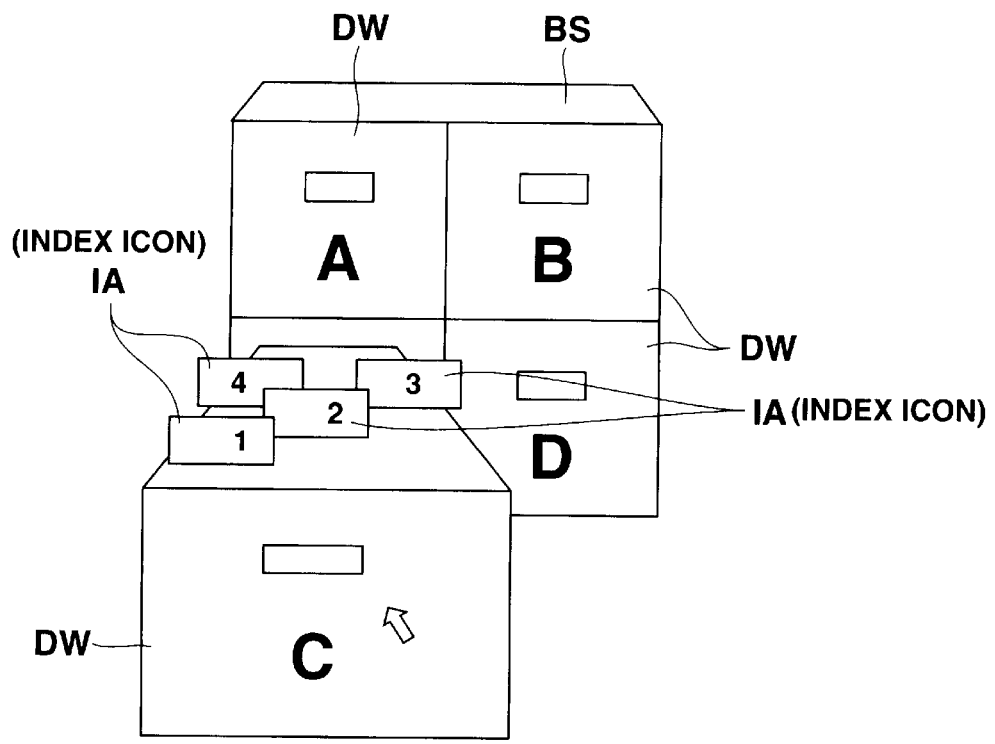

FIGS. 2A, 2B illustratively shows a menu selection screen. This menu selection screen is displayed in the case that an arbitrary menu item is selected from various sorts of menu items which constitute a hierarchical-structural menu. A cabinet image (CG) is displayed on this menu selection screen. This cabinet image graphically simulates an actual document storing cabinet. It should be noted that the data about this cabinet image (CG) is usually saved in the storage unit 2, or is externally supplied from the storage medium 3 such as a floppy disk (not shown in detail). Generally speaking, there are two different storage formats of image data, namely, a bit map image in which a shape of an image is expressed by a set body of dots, and a shape of such an image which is expressed by numeral values by using a set of straight lines and curves which connect with reference points of each of image portions. In this first embodiment mode, the data expressed by the numeral values is employed, since this data is readily deformed, as compared with the bit map image. Then, the cabinet image (CG) constitutes a box shape as an entire shape, and corresponds to a three-dimensional image as viewed from the upper oblique direction. As seen from the cabinet image of FIGS. 2A, 2B a cabinet holder (DW) is illustrated. This cabinet holder DW is constituted by four sets of drawing portions which may be drawn with respect to a cabinet main body (BS). In this drawing, an upper left cabinet holder, an upper right cabinet holder, a lower left cabinet holder, and a lower right cabinet holder correspond to upper-grade menu items A to D of the different classifications. When an arbitrary cabinet holder (DW) is designated by using a mouse cursor, the upper-grade menu item corresponding to this arbitrary cabinet holder (DW) is selected. In other words, the cabinet holders (DW) are menu icons indicative of the upper-grade menu items. In this first embodiment, 4 sorts of upper-grade menu items are displayed. It should also be noted that the menu item names are indicated on the front-surfaces of the cabinet holders (DW). With each of the cabinet holders (DW), an identifier (index icon) indicative of a lower-grade menu item corresponding thereto is stored. When one cabinet holder (DW) is drawn out, an index icon (IA) appears. This index icon (IA) represents a lower-grade menu item stored into this drawn cabinet holder. These index icons are displayed as a list. In this case, FIG. 2A illustratively shows such a condition. that the respective cabinet holders (DW) are closed with respect to the cabinet main body (BS). FIG. 2B illustratively shows such a condition that only the cabinet holder (DW) of the upper-grade menu item C is drawn out. In this case, the cabinet holders (DW) may be drawn out, or may be pushed into the inside positions. When the cabinet holders (DW) are drawn out, the index icons (IA) corresponding thereto are displayed as a list. Furthermore, a total icon number may be increased/decreased in correspondence with a drawn amount of the relevant cabinet holder (DW).

In this case, when an arbitrary cabinet holder (DW) is drawn, or pull out, the mouse cursor is pointed on a desirable holder position. At this time, even when the mouse cursor is not correctly pointed on this desirable holder position, but is merely pointed on an arbitrary position within this holder, this holder may be specified as the holder to be drawn. Under such a condition, when a mouse button (either right button or left button) of this mouse is depressed, the cabinet holder (DW) is gradually pulled out along a forward direction. At this stage, the CPU 1 detects the drawing amount of this cabinet holder (DW), and furthermore, enlarges the cabinet holder (DW) in a step wise manner in response to this detected drawing amount. In this case, while the mouse button is continuously depressed, the cabinet holder (DW) is gradually pulled out, and also is gradually enlarged by utilizing the perspective drawing method. That is, such a realistic display mode may be achieved. That is, the user can have such a feeling that the user can actually draw the storage cabinet. When the cabinet holder (DW) is gradually pulled out and is gradually enlarged in connection with the continuous manipulation operation of the mouse button, the index icons (IA), the quantity of which is related to the drawing amount of this cabinet holder (DW), are displayed within the cabinet holder (DW) as a list. In this case, these index icons (IA) are listed in the cabinet holder (DW) in such an order defined by the selection frequencies (use frequencies) at which the lower-grade menu items have been selected in the past menu selections. In other words, reference numerals "1" to "4" shown in FIG. 2B indicate the display order of the index icons (IA). When a use frequency of an arbitrary index icon is higher that of other index icons, this arbitrary index icon is displayed at a front (forward) position.

Data Structures of Tables

FIG. 3A illustratively shows a data structure of a cabinet management table 21 stored in the storage unit 2 of FIG. 1. This cabinet management table 21 stores thereinto the index icons (IA) indicative of the lower-grade menu items saved in the relevant cabinet holder (DW) with respect to each of the cabinet holders (DW) corresponding to the upper-grade mend items "A" to "E". The cabinet management table 21 further stores thereinto such a "drawing level". This drawing level indicates how degree the relevant cabinet holder (DW) is drawn from the cabinet main body (BS). In this first embodiment, a minimum value "0" of this drawing level indicates such a condition that the relevant cabinet holder (DW) is not drawn; a value "1" of this drawing level shows such a condition that the relevant cabinet holder (DW) is drawn at a first stage; and subsequently, until the drawing level reaches a maximum value, the cabinet holder (DW) is drawn in a step wise manner (in unit of a predetermined dot). The drawing level saved in the cabinet management table 21 is updated in response to the above-explained stepped drawing operations. Also, a "file name" is stored/managed every index icon (IA) stored in the cabinet management table 21, and also a "use frequency" is stored/managed with respect to each of the index icons. In this case, such a "file name" specifies a file called when a low-grade menu item corresponding to an index icon thereof is selected. Also, a "use frequency" represents a past use frequency of a lower-grade menu item corresponding to an index icon, which was selected. Every time the lower-grade menu is selected, the "use frequency" corresponding thereto is updated.

FIG. 3B illustratively shows a data structure of a drawing level table 22 stored in the storage unit 2 of FIG. 1. This drawing level table 22 stores thereinto a "holder size" in response to a drawing level 1, 2, - - - , or "n" of the cabinet holder DW. Also, this drawing level table 22 stores thereinto a "display icon number". In this case, a "holder size" defines an enlargement size when a cabinet holder (DW) is enlarged in response to a drawing amount of this cabinet holder (DW). The holder sizes own a relationship of S1<S2<S3, - - - . A "display icon number" defines the number of the index icons (IA) displayed within the relevant cabinet holder (DW). The larger the drawing amount of the cabinet holder (DW) is increased, the larger the display icon number is increased. As a result, when the drawing amount of the cabinet holder (DW) is increased, a total number of the displayed index icons (IA) is increased.

Hierarchical Menu Selecting Process

Referring now to a flow chart of FIG. 4, a hierarchical menu selecting process operation executed in the data processing apparatus of FIG. 1 will be described. It should be understood that a program capable to realize the respective functions described in this flow chart is stored in the storage medium 3 in the format of the readable program code, and the CPU 1 sequentially executes various operations in accordance with this program code.

When this hierarchical menu is selected, such a cabinet image (CG) as shown in FIG. 2A is displayed on the menu selection screen. In this display condition, all of the respective cabinet holders (DW) with respect to the cabinet main body (BS) are brought into the close conditions. Under this holder close condition, when the mouse cursol is moved to an arbitrary cabinet holder (DW) by manipulating the mouse so as to select this designated cabinet holder, and further the mouse button is depressed, the CPU 1 commences the hierarchical menu selecting process operation described in the flow chart of FIG. 4. First, the CPU 1 judges as to whether or not the selected cabinet holder (DW) is brought into the drawing condition by referring to the relevant "drawing level" stored in the cabinet management table 21 (step A1). Now, since the drawing level is equal to "0", the CPU 1 sets this drawing level to "1" at a step A2. Also, the CPU 1 reads out the enlargement size corresponding to this drawing level from the drawing level table 22, and thus enlarges the size of the selected cabinet holder DW based upon the read enlargement size (step A3). In this enlargement case, the front surface of this cabinet holder is enlarged in accordance with this enlargement size, and further the enlarged cabinet holder is moved along the forward direction by a distance corresponding to the read drawing level. Then, the front surface of the cabinet holder is coupled to the cabinet main body BS by way of the perspective drawing method at a step A4. The CPU 1 reads out the display icon number corresponding to the drawing level from the drawing level table 22 so as to determine a total icon number (step A5). Then, the CPU 1 extracts a plurality of index icons (IA), whose number is predetermined, in the order of the use frequencies, among the respective index icons (IA) saved in the selected cabinet holder with reference to the content of the cabinet management table 21 (step A6). Thereafter, the extracted index icons (IA) are rearranged in the order of the use frequencies within the selected cabinet holder under control of the CPU 1 at a step A7.

Figure 5:
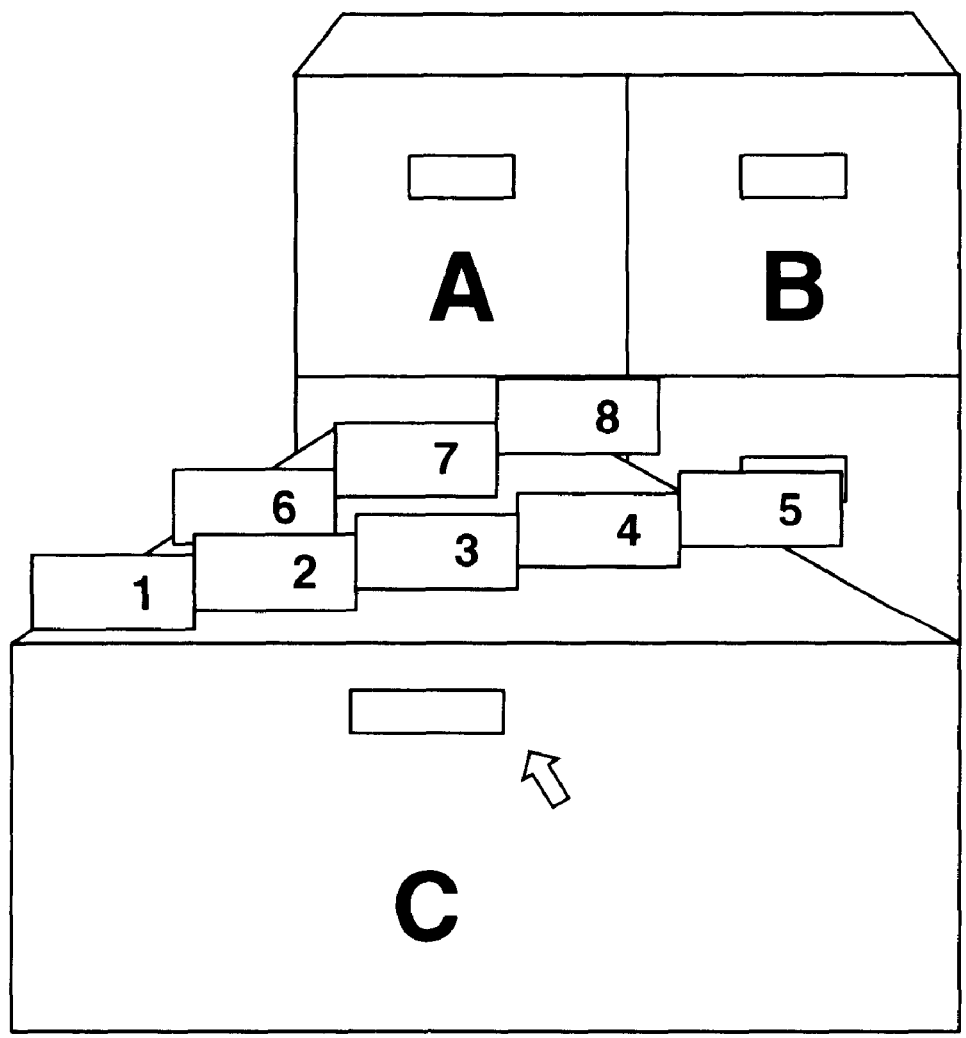
FIG. 5 is a display condition diagram for illustratively showing such a case that the cabinet holder DW is drawn until the drawing level thereof reaches a maximum drawing level.

In the case that while the cabinet holder (DW) which is arbitrarily selected in this manner is drawn along the forward direction in response to the drawing level, this selected cabinet holder is enlarged and also, the plural index icons (IA) whose number is equal to the drawing level are arranged within the cabinet holder in the arranging order depending on the use frequencies, the display condition of this arbitrarily selected holder is changed into the corresponding display condition (step A8). Then, the CPU 1 pluses "1" to the drawing level at a step A10 under such a condition that the mouse button is continuously manipulated (step A9). Subsequently, the hierarchical menu selecting process operation is returned to the previous step A3 at which the above-explained process operation is carried out. As explained above, such a holder drawing operation is repeatedly performed until the continuous manipulation of the mouse button is released, otherwise the drawing level reaches the maximum value. As a result, the selected holder is gradually pulled out in connection with the time elapse while the mouse button is continuously manipulated. FIG. 5 illustratively represents such a cabinet display condition that the selected holder is further pulled out from the cabinet display condition shown in FIG. 2B. In other words, FIG. 5 shows such a cabinet display condition that the selected holders are drawn until the drawing level reaches the maximum value. The size of the front surface portion of this selected holder is enlarged by approximately 3 times, as compared with the original condition (see FIG. 5A), and is enlarged by approximately 2 times as compared with the holder condition of FIG. 2B. Also, a total number of the index icons (IA) displayed in the selected cabinet holder becomes two times larger than that of the cabinet display condition shown in FIG. 2B.

Figure 6:
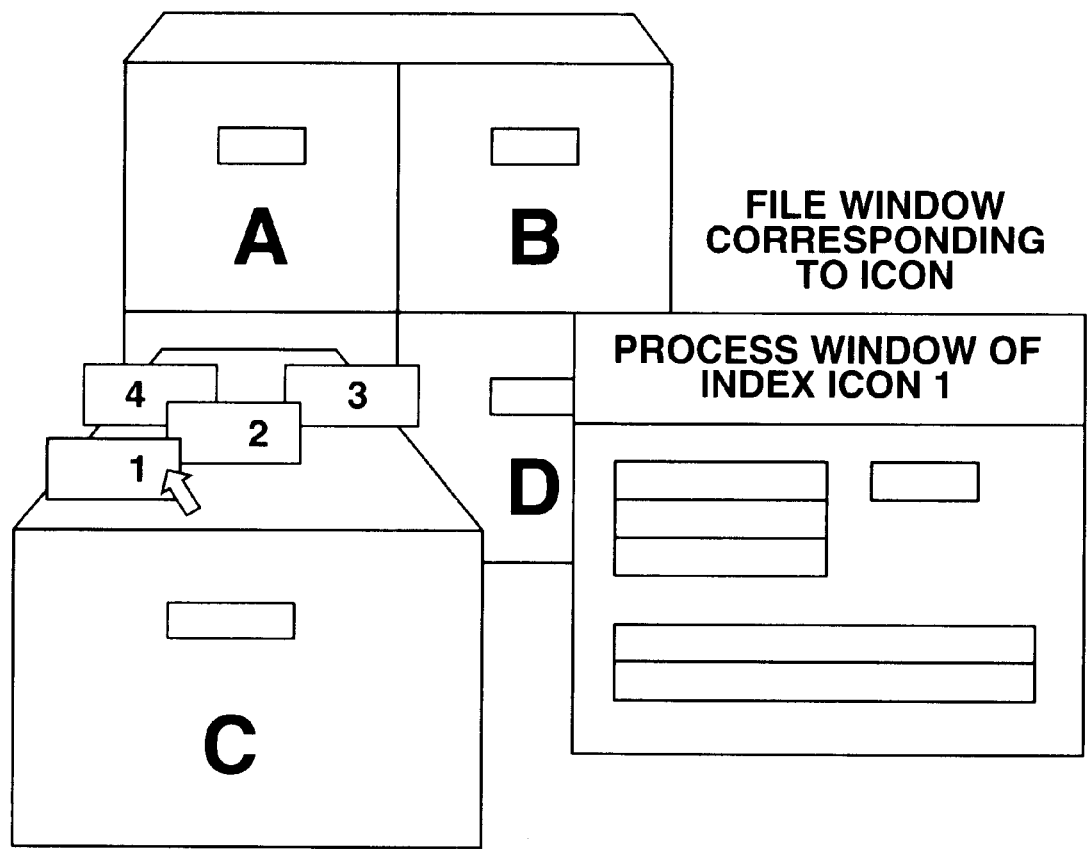
FIG. 6 is a display condition diagram for illustratively showing such a case that an arbitrary index icon IA displayed within the cabinet holder DW is selected.
Figure 7:
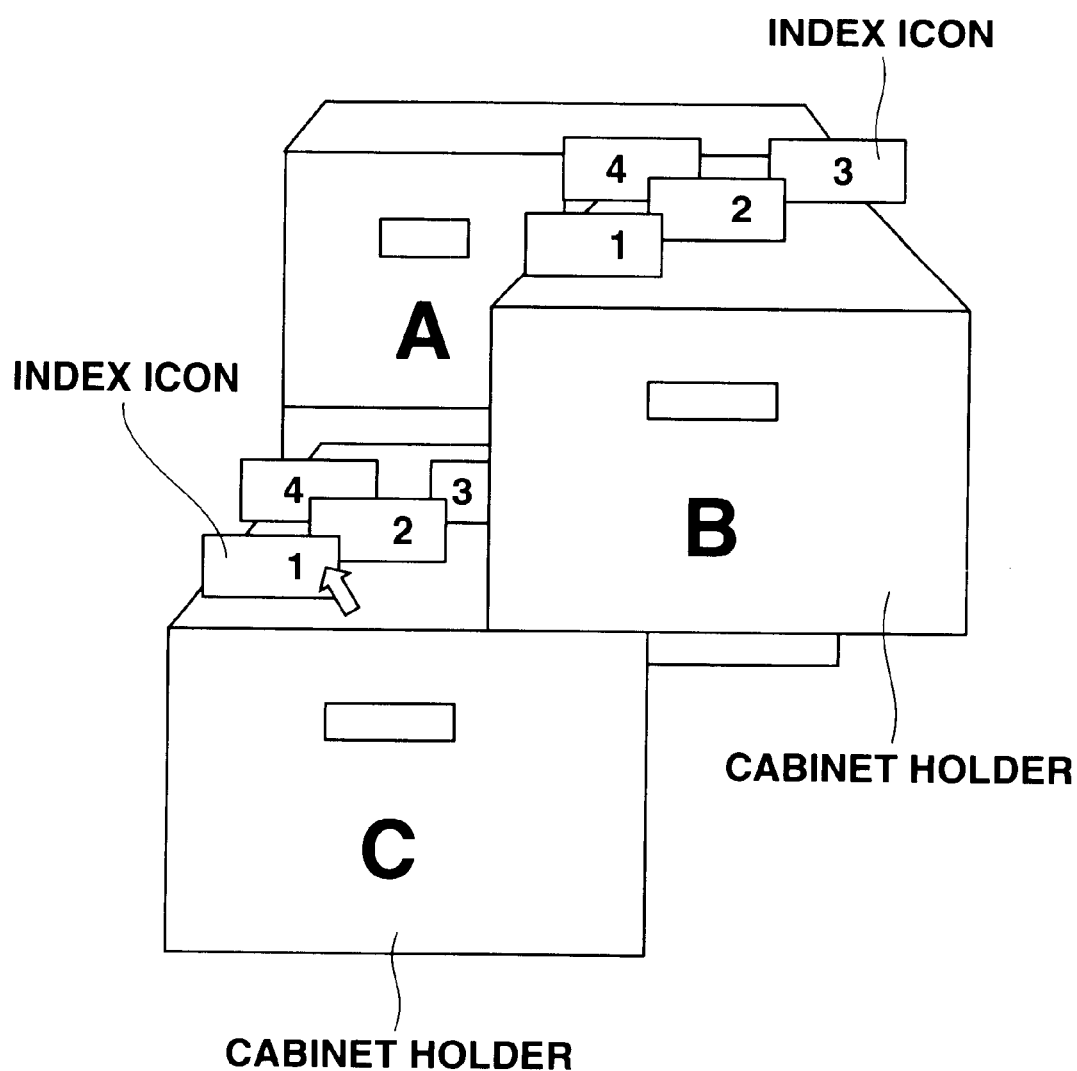
FIG. 7 is a display condition diagram for illustratively showing such a case that 2 sorts of cabinet holders DW are drawn.
Figure 8:
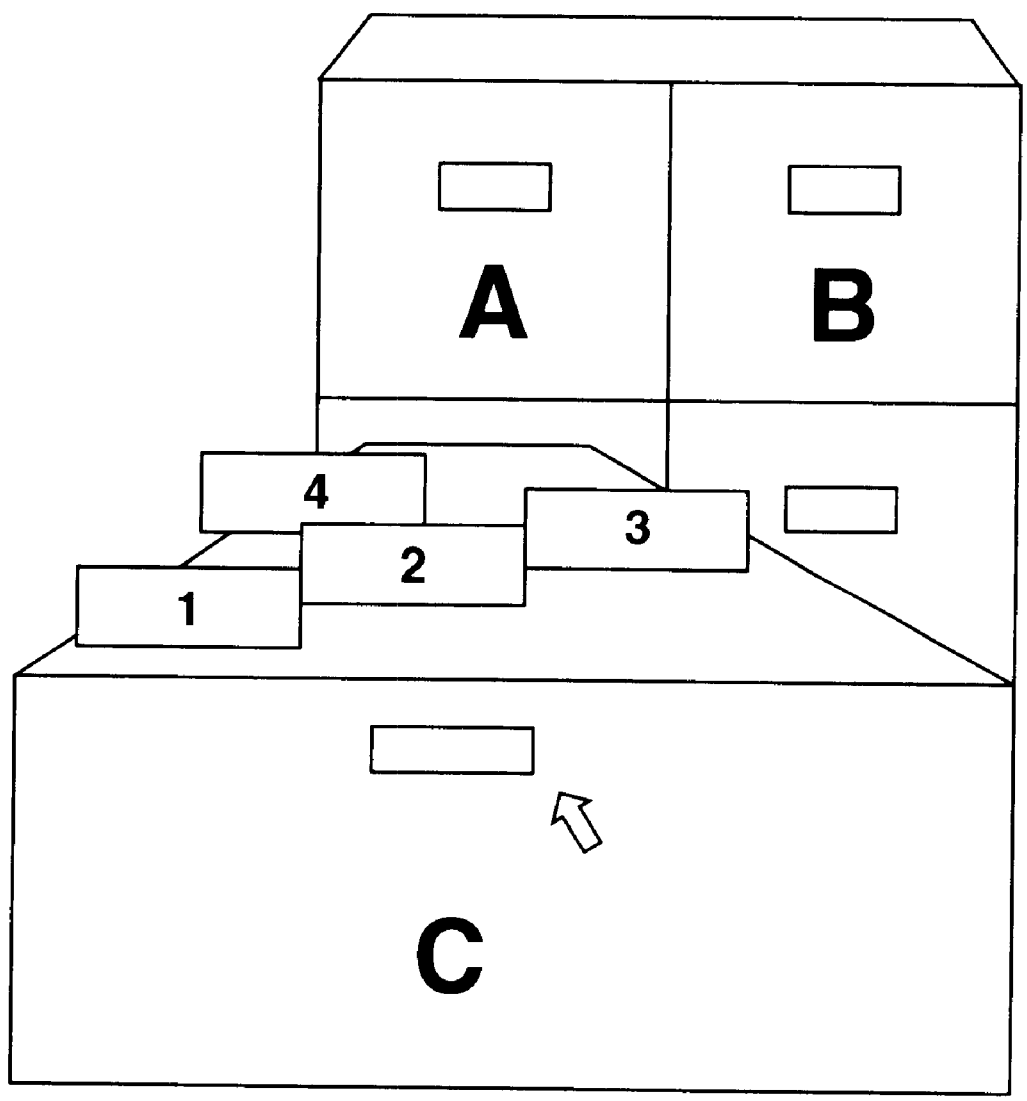
FIG. 8 is a display condition diagram for explaining a modification of a display condition diagram of the data processing apparatus according to the first embodiment mode.

When the mouse button is now turned OFF, since releasing of the continuous manipulation is detected at a step A9, the hierarchical menu selecting process operation is advanced to a step A11. At this step A11, the CPU 1 waits for an instruction to an index icon (IA) contained in a selected cabinet holder. In this condition, when the mouse cursor is moved to an arbitrary index icon (IA), and this index icon is selected/instructed (step A12), the CPU 1 reads out a file name corresponding to this selected index icon from the cabinet management table 21 and then displays the relevant file in the window (step A13). FIG. 6 illustratively shows such a file window that when the index icon whose display order is "1". is selected/instructed, the file corresponding to this selected icon is displayed. On the other hand, FIG. 7 illustratively represents such a display condition that the cabinet holders (DW) of the upper-grade menu items B and C are selected, both these cabinet holders are drawn at the same time. In this case, under such a condition that one cabinet holder is pulled out, if next cabinet holder is selected to be drawn, then this drawing condition is illustrated in FIG. 7. As previously explained, under such a condition that a plurality of cabinet holders (DW) are drawn at the same time, if the index icon (IA) contained in one cabinet holder is selected, then the file corresponding to this index icon can be opened, whereas if the index icon (IA) contained in the other holder is selected, then the file corresponding to this index icon can be opened.

On the other hand, under such a condition that the cabinet holder (DW) is drawn-from the cabinet main body (BS), when the mouse cursor is moved to this holder and is again selected/instructed, and furthermore, the mouse button is depressed, a process operation (defined from steps A14 to A20) is-carried out by which this selected cabinet holder is pulled in the cabinet main body (BS) along the backward direction. In other words, if the selected cabinet holder (DW) is brought into the drawn condition, then this drawn condition is detected by the CPU 1 at the step A1, and the selecting process operation is advanced to a further step A14. At this step A14, the CPU 1 minuses 1 from the drawing level corresponding to this selected holder. Then, the CPU 1 reduces the size of the holder front surface based upon this drawing level, and moves the holder front surface along the backward (pulling-in) direction in response to this drawing level (step A15). Thereafter, this holder front surface is coupled to the cabinet main body (BS) by utilizing the perspective drawing method (step A16). Next, the CPU 1 determines a total number of index icons in correspondence with the drawing level (step A17). Also, the CPU 1 deletes such icons whose use frequencies are low from the selected holders in such a manner that the total icon quantity within the selected cabinet holder becomes equal to the determined total icon number (step A18). As a result, the present display condition of this selected holder is changed into such a display condition corresponding to the drawing level (step A19). Then, under such a condition that the mouse button is continuously manipulated (step A20), the CPU 1 again minuses 1 from the drawing level (step A14), and subsequently, repeatedly executes the process operation in correspondence with this minused drawing level. Such a process operation is repeatedly carried out until this continuous manipulation is released, or the value of the drawing level reaches the minimum value "0". As a result, the selected cabinet holder is gradually pushed in the cabinet main body (BS) while the time required for the continuous manipulation has passed. It should be noted that after the continuous manipulation is released, the process operation is advanced to the steps A11 to A13, at which the file corresponding to the selected icon can be opened.

Advantages of First Data Processing Apparatus

As previously explained, in accordance with the data processing apparatus of the first preferred embodiment mode, when the hierarchical menu is selected, the cabinet image (CG) is displayed on the menu selection screen. The respective cabinet holders (DW) which constitute this cabinet image (CG) are made in correspondence with the respective upper-grade menu items. Also, the respective index icons (IA) stored into the respective cabinet holders (DW) are made in correspondence with the lower-grade menu items. As a consequence, the users can select the desirable upper-grade menu item and the desirable lower-grade menu item while the users can have such feelings that the storage cabinets are actually used by these users. In other words, since the user designates an arbitrary cabinet holder (DW), the user can select the upper-grade menu item corresponding to this arbitrary cabinet holder. Further, the selected cabinet holder is pulled out along the forward direction, so that the index icons (IA) are displayed in this drawn cabinet holder in the list form. Then, when an arbitrary index icon is selected from the index icon list, the lower-grade menu item corresponding to this arbitrary index icon can be selected. In this case, the size of the cabinet holder (DW) is enlarged/reduced in response to the drawing amount of this cabinet holder, and also the enlarged/reduced cabinet holder (DW) is displayed by using the perspective drawing method. As a result, the user can have such a feeling that this user actually uses the cabinet holder. As a consequence, the user can easily select the desirable menu in the visual manner, and moreover can effectively select such a desirable item. In this case, even when the cabinet holder corresponding to the upper-grade menu item is pulled out, this cabinet holder is continuously displayed. Therefore, both the upper-grade menu items and the lower-grade menu items can be confirmed within the same screen, so that the user can readily grasp the menu hierarchical structure.

Also, a plurality of index icons (IA) are displayed within the cabinet holder (DW) in the list form, the total number of which corresponds to the drawing level of the cabinet holder (DW). As a result, the larger the drawing amount is increased, the larger the total number of index icons (IA) is increased. This featured operation may be approximated to the actual use feelings. In this case, these index icons displayed in the cabinet holder (DW) are arranged in accordance with the use frequencies thereof. Thus, the user can easily select the desirable index icon. Furthermore, since the index icons (IA) within the cabinet holder (DW) can be arbitrarily selected under such a condition that the cabinet holder (DW) has been pulled out, even in such a case that after one desirable lower-grade menu item has been selected, another desirable lower-grade menu item is selected, the first data processing apparatus can have the following advantage, as compared with the conventional data processing apparatus in which the selection menu must be once returned to the upper-grade menu layer. That is, the user can directly select the second desirable lower-grade menu item. Also, under such a condition that a plurality of cabinet holders (DW) are pulled out, an arbitrary index icon (IA) is selected from one cabinet holder (DW). Thereafter, another arbitrary index icon (IA) may be selected from another cabinet holder (DW). As a result, the free degree of the menu selecting operation can be increased, and the desirable menu can be selected in a higher efficiency.

Modifications of First Data Processing Apparatus

As previously explained, in the above-explained first embodiment mode, a total number of the index icons (IA) displayed with the cabinet holder (DW) is increased/decreased in accordance with the drawing level of the cabinet holder (DW). Alternatively, this number of the index icons (IA) is not increased/decreased in response to this drawing amount of the cabinet holder, but the sizes of these index icons (IA) may be enlarged/reduced based upon this drawing amount. In other words, the larger the drawing amount of the cabinet holder (DW) is increased, the greater the size of the index icon (IA) may be gradually enlarged. Conversely, the smaller the drawing amount of this cabinet holder (DW) is decreased, the smaller the size of this cabinet holder may be gradually reduced. This alternative case is represented as a display condition diagram of FIG. 8. As seen from FIG. 8, the drawing amount of this index icon (IA) is similar to that of FIG. 2B, whereas the dimension of the index icon (IA) is different from that of FIG. 2B, namely is enlarged by approximately 1.5 times larger than that of FIG. 2B. As previously explained, the index icon (IA) may be displayed with having such a suitable size for the user by controlling the drawing amount of the index icon (IA). Also, in this alternative case, since the characters indicated in the icon are enlarged, the user can readily discriminate a desirable character from these enlarged characters.

Furthermore, the first embodiment exemplifies the menu selection. The data processing apparatus according to this first embodiment mode may be similarly realized, while selecting a data file, a database, a window, a list box, and a view. In this alternative case, the cabinet holder (DW) may be made in correspondence to a main classification, and the index icon (IA) may be made in correspondence to a sub-classification. Also, in the first embodiment mode, when the cabinet holder (DW) is selectively designated by the click-operation of the mouse, the CPU 1 determines as to whether the cabinet holder is pulled in, or out by checking as to whether or not this cabinet holder is drawn from the cabinet main body. Alternatively, the cabinet holder (DW) may be pulled out by clicking the right button of the mouse, and may be pulled in by clicking the left button of the mouse. Furthermore, a total number of cabinet holders (DW) is arbitrarily selected. Also, such a cabinet image (CG) equipped with a plurality of cabinet holders (DW) may be displayed on the same screen in a parallel display manner. In this alternative case, the respective cabinet images (CG) may be made in correspondence with the main classification, the respective holders (DW) displayed in each of the cabinet images (CG) may be made in correspondence with the medium classification, and the index icons (IA) displayed within the cabinet holder (DW) may be made in correspondence with the minor classification, so that a total hierarchical number may be furthermore increased. Also, the shapes of the cabinet image (CG), the holder (DW), and index icon (IA) are arbitrarily selected. Further, in such a case that a plurality of cabinet holders (DW) are drawn and then these drawn cabinet holders are overlapped with each other, the last-drawn cabinet holder may be displayed with a priority. When more than two cabinet holders (DW) are pulled out, these plural cabinet holders may be displayed in such a manner that these cabinet holders are separated from each other so as not to be overlapped with each other. Also, although the index icons (IA) are arranged in the order of the use frequencies thereof, these index icons (IA) may be displayed in different colors based upon the use frequencies.

Second Data Processing Apparatus

Referring now to a flow chart shown in FIG. 9, a description will be made of a data processing apparatus according to a second preferred embodiment of the present invention. It should be noted that in the first embodiment mode, the cabinet holder (DW) is gradually pulled out and/or pulled in with respect to the cabinet main body by continuously manipulating the mouse button. The second embodiment mode is featured by that the cabinet holder (DW) is pulled out and/or pulled in with respect to the cabinet main body in response to a dragging direction of a mouse. Other operations of the second embodiment are basically identical to those of the first embodiment, and therefore, only the featured operation will now be explained.

Figure 9:
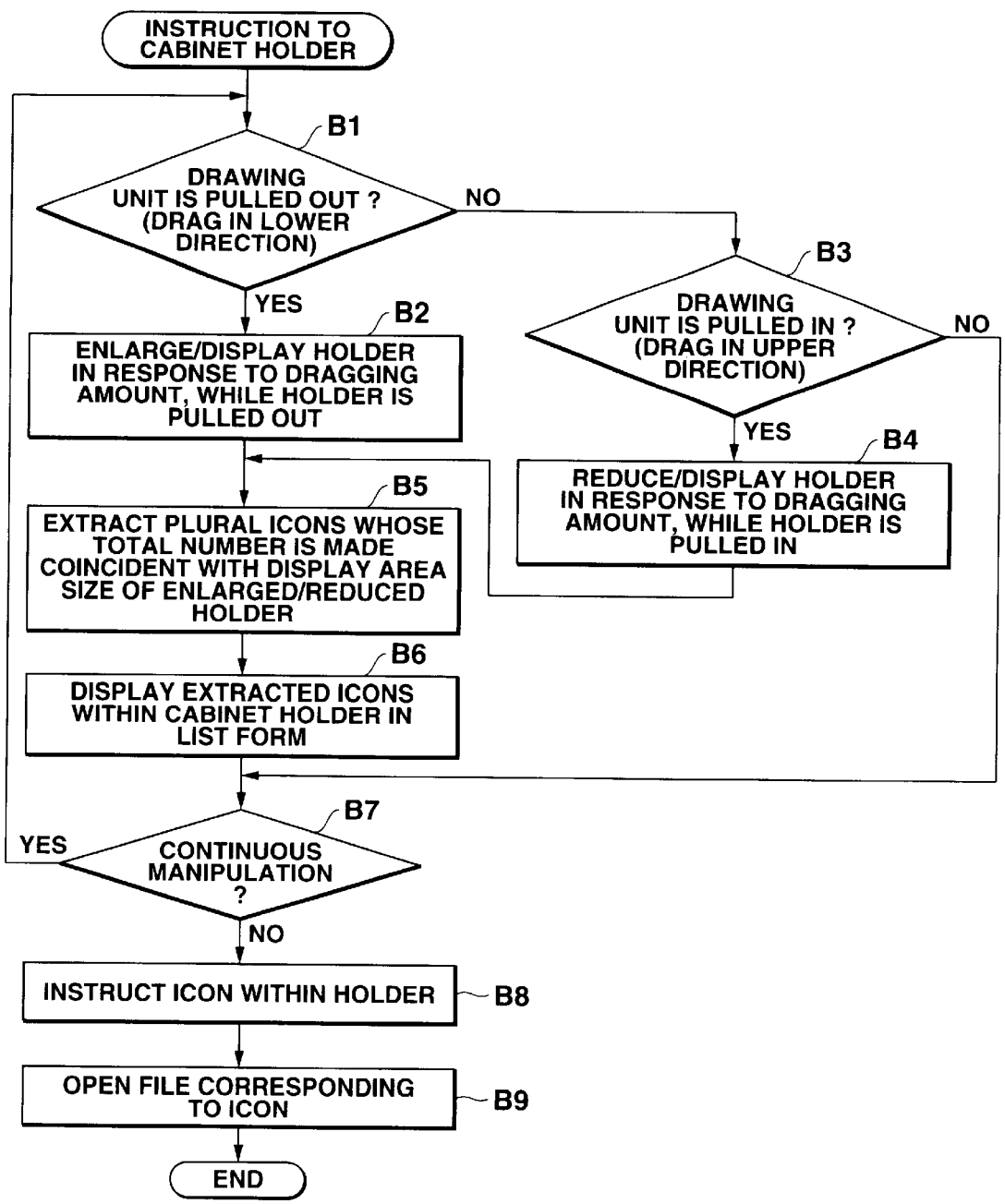
FIG. 9 is a flow chart for describing process operation of a data processing apparatus according to a second embodiment mode of the present invention.

First, when the process operation defined in the flow chart of FIG. 9 is commenced in response to an operation instruction issued to a cabinet holder (DW), the CPU 1 judges a dragging direction of a mouse (step B1). When the CPU 1 judges such a dragging operation that the mouse is moved along the lower direction, the CPU 1 executes such a process operation that the relevant cabinet holder (DW) is drawn with respect to the cabinet main body. To the contrary, when the CPU 1 judges such a dragging operation that the mouse is moved along the upper direction, the CPU 1 executes such a process operation that the relevant cabinet holder (DW) is pulled in with respect to the cabinet main body. In other words, when this dragging operation is carried out along the lower direction, while the cabinet holder (DW) is drawn, this drawn cabinet holder (DW) is displayed in the enlargement manner in response to the drag amount thereof (step B3). Also, when this dragging operation is carried out along the upper direction, while the cabinet holder (DW) is pulled in, this drawn cabinet holder (DW) is displayed in the reduced manner in response to the drag amount thereof (step B4).

Then, the CPU 1 acquires display area sizes of the enlarged/reduced cabinet holders, and extracts a plurality of index icons (IA), the total number of which is equal to this to acquired display area size (step B5). In this connection, the cabinet holder (DW) is enlarged/reduced in the response to the drawing level in the first embodiment mode. In contrast, since the cabinet holder (DW) is enlarged/reduced in a stepless manner in response to the dragging amount, the plural index icons (IA), the total number of which is equal to the display area size, is extracted. Then, the extracted index icons (IA) are displayed in a list form within the cabinet holder (DW) (step B6). Such an operation is repeatedly performed while the dragging operation of the mouse is carried out (step B7). When this dragging operation is repeated, the CPU 1 waits for another instruction with respect to these listed index icons (IA). When an arbitrary index icon is designated, the relevant file is opened (steps B8 and B9).

As previously explained, the data processing apparatus according to the second embodiment owns a similar effect to that of the first embodiment. Furthermore, since the cabinet holder (DW) is pulled out/pulled in with respect to the cabinet main body in accordance with the mouse dragging direction, the user can have such a feeling that the user actually opens and/or closes the cabinet holders. Also, in this second embodiment, the cabinet holder (DW) can be pulled out/pulled in in the stepless manner, and also the plural index icons (IA) whose total number is determined in accordance with the display size of this cabinet holder can be displayed, the user can have more realistic feelings.

In addition, in accordance with the data processing apparatus of the second embodiment, not only such a menu made of the hierarchical structure with employment of the cabinet image (CG) can be used, but also a list-formed menu may be employed. In this alternative case, a total number of menu items may be increased/decreased by drawing such a menu screen, or pulling in this menu screen. For example, the menu screen may be freely moved by pulling out a pull-down menu, or pulling in this pull-down menu.

What is claimed is:

1. A menu display apparatus comprising:

cabinet image display means for displaying a cabinet image represented by such an image structure that a drawing unit is stored into a cabinet main body;

display control means for displaying said drawing unit in such a shape that said drawing unit is drawn with respect to said cabinet main body in response to an operation instruction issued to the drawing unit within said cabinet image, and also for displaying an identifier of each of items related to said drawing unit within said drawing unit in response to said operation instruction; and item selecting means for selectively designating a desirable identifier among the respective item identifiers which are displayed in a list form within said drawing unit; whereby:

said menu display apparatus displays a menu used to select a desirable item designated by said desirable identifier.

2. A menu display apparatus as claimed in claim 1 wherein:

said display control means detects a drawing amount of the drawing unit with respect to the cabinet main body, and also displays said drawing unit by enlarging/reducing the display size of said drawing unit in response to said detected drawing amount by using a perspective drawing method.

3. A menu display apparatus as claimed in claim 1 wherein:

when such an operation instruction that the drawing unit is pulled out from the cabinet image along a forward direction is issued, said display control means displays said drawing unit in such a shape that said drawing unit is drawn with respect to said cabinet main body and also displays the identifiers of the respective items related to the drawing units in the list form on said drawing units, whereas when such an operation instruction that the drawing unit which has been pulled out along the forward direction is pulled in the cabinet main body along a backward direction is issued, said display control means displays said drawing unit in such a shape that said drawing unit is stored into the cabinet main body and also deletes the display of the list of said item identifiers from said pulled-in drawing unit.

4. A menu display apparatus as claimed in claim 1, further comprising:

storage means for storing thereinto data corresponding to each of said item identifiers; and calling means for calling from said storage means, data corresponding to the item identifier selectively designated by said item selecting means.

5. A menu display apparatus as claimed in claim 1 wherein:

said cabinet image is a menu image having a hierarchical structure formed by that the respective drawing units are made in correspondence with upper-grade menu items, and the respective item identifiers which are displayed in the list form within the respective drawing units are made in correspondence with lower-grade menu items.

6. A menu display apparatus comprising:

image display means for displaying an image represented by such an image structure that a plurality of drawings are stored into storage units thereof;

operation detecting means for detecting a drawing amount of a desirable drawing unit when an instruction is issued so as to draw said desirable drawing unit among said plurality of drawing units displayed within said image;

display control means for displaying said drawing-instructed desirable drawing unit in a display size defined in response to said detected drawing amount; and item display means for displaying.the respective items related to said drawing-instructed desirable drawing unit within said desirable drawing unit in such a display form in accordance with the display size of said desirable drawing unit; whereby:

said menu display apparatus displays a menu used to select the respective items related to said desirable drawing unit.

7. A menu display apparatus as claimed in claim 6 wherein:

said item display means displays the display sizes of the respective item indexes within said drawing unit in enlarged/reduced display sizes in correspondence with the display size of the drawing unit.

8. A menu display apparatus as claimed in claim 6 wherein:

said item display means increases/decreases a total number of the items displayed within said desirable drawing unit in correspondence with the display size of the desirable drawing unit.

9. A menu display apparatus as claimed in claim 6 wherein:

said menu display apparatus is further comprised of use frequency managing means for managing use frequencies of the respective items related to said drawing units; and said item display means displays an item with a priority, whose use frequency is high, within the drawing unit by referring to the use frequencies of the respective items.

10. A menu display apparatus as claimed in claim 6, further comprising:

display area allocating means for classifying a plurality of selectable menu items into a plurality of groups and for allocating said menu display areas to the respective classified groups; and group name display means for displaying group names corresponding to the menu display areas of the respective groups; and wherein:

said display area changing means performs an operation capable of changing the dimension of the menu display area with respect to any of the display area within said plurality of display areas allocated by said display area allocating means.

11. A storage medium for storing thereinto a computer-readable program code and a computer-readable data code, comprising:

an image display program code for displaying a cabinet image represented by such an image structure that a drawing unit is stored into a cabinet main body, a display control program code for displaying said drawing unit in such a shape that said drawing unit is drawn with respect to said cabinet main body in response to an operation instruction issued to the drawing unit within said cabinet image, and also for displaying an identifier of each of items related to said drawing unit within said drawing unit in response to said operation instruction; and an item selecting program code for selectively designating a desirable identifier among the respective item identifiers which are displayed in a list form within said drawing unit.

12. A storage medium for storing thereinto a computer-readable program code and a computer-readable data code, comprising:

an image display code for displaying an image represented by such an image structure that a plurality of drawings are stored into storage units thereof;

an operation detecting program code for detecting a drawing amount of a desirable drawing unit when an instruction is issued so as to draw said desirable drawing unit among said plurality of drawing units displayed within said image;

a display control program code for displaying said drawing-instructed desirable drawing unit in a display size defined in response to said detected drawing amount; and an item display program code for displaying the respective items related to said drawing-instructed desirable drawing unit within said desirable drawing unit in such a display form in accordance with the display size of said desirable drawing unit.

* * * * *